United States Patent
Hsu

(10) Patent No.: US 10,701,392 B2
(45) Date of Patent: Jun. 30, 2020

(54) METHOD AND APPARATUS FOR MOTION VECTOR SIGN PREDICTION IN VIDEO CODING

(71) Applicant: MEDIATEK INC., Hsin-Chu (TW)

(72) Inventor: Chih-Wei Hsu, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/462,559

(22) PCT Filed: Nov. 21, 2017

(86) PCT No.: PCT/CN2017/112140
§ 371 (c)(1),
(2) Date: May 21, 2019

(87) PCT Pub. No.: WO2018/095313
PCT Pub. Date: May 31, 2018

(65) Prior Publication Data
US 2019/0289317 A1    Sep. 19, 2019

Related U.S. Application Data

(60) Provisional application No. 62/425,172, filed on Nov. 22, 2016.

(51) Int. Cl.
*H04N 19/00* (2014.01)
*H04N 19/52* (2014.01)
(Continued)

(52) U.S. Cl.
CPC .......... *H04N 19/52* (2014.11); *H04N 19/139* (2014.11); *H04N 19/593* (2014.11)

(58) Field of Classification Search
CPC ..... H04N 19/52; H04N 19/139; H04N 19/593
See application file for complete search history.

(56) References Cited

U.S. PATENT DOCUMENTS 9,654,793 B2    5/2017 Bordes et al.
2013/0003849 A1*  1/2013 Chien .................. H04N 19/52
                                                  375/240.16
(Continued)

FOREIGN PATENT DOCUMENTS

| CN | 104519363 A | 4/2015 |
| CN | 104641645 A | 5/2015 |
| WO | 2015/033510 A1 | 3/2015 |

OTHER PUBLICATIONS

International Search Report dated Feb. 23, 2018, issued in application No. PCT/CN2017/112140.
(Continued)

*Primary Examiner* — Zhihan Zhou
(74) *Attorney, Agent, or Firm* — McClure, Qualey & Rodack, LLP

(57) ABSTRACT

A method and apparatus of motion vector reconstruction based on one MVP (motion vector predictor) and one MVD (motion vector difference) are disclosed. According to this method, input data associated with a video sequence including a current block in a current picture are received. Candidate reconstructed MV (motion vector) positions corresponding to all candidate sign pairs of the MVD are derived, where each candidate reconstructed MV position is derived as a vector sum of the MVP and the first magnitude and the second magnitude of the MVD with one candidate sign pair of the MVD. Template matching between the template for the current block and a corresponding template for each candidate reconstructed MV position is evaluated. A target candidate MV position among all candidate reconstructed MV positions is selected. The current block is encoded or decoded using a target candidate MV corresponding to the target candidate MV position.

20 Claims, 3 Drawing Sheets

(51) Int. Cl.
*H04N 19/139* (2014.01)
*H04N 19/593* (2014.01)

(56) References Cited

U.S. PATENT DOCUMENTS

| | | | |
|---|---|---|---|
| 2014/0078249 A1* | 3/2014 | Wang .................. | H04N 19/597 |
| | | | 348/43 |
| 2014/0079116 A1 | 3/2014 | Wang | |
| 2014/0092962 A1 | 4/2014 | Auyeung | |
| 2015/0085934 A1* | 3/2015 | Bordes .................. | H04N 19/70 |
| | | | 375/240.16 |
| 2016/0301941 A1 | 10/2016 | Chono et al. | |
| 2018/0091816 A1* | 3/2018 | Chien .................... | H04N 19/13 |
| 2018/0098089 A1* | 4/2018 | Chen .................... | H04N 19/136 |

OTHER PUBLICATIONS

Stankowski, J., et al.; "Analysis of Compressed Data Stream Content in HEVC Video Encoder," Jun. 2015; pp. 1-8.

Sze, V., et al.; "High Throughput CABAC Entropy Coding in HEVC;" IEEE Transactions on Circuits and Systems for Video Technology; vol. 22; No. 12; Dec. 2012; pp. 1778-1791.

\* cited by examiner

METHOD AND APPARATUS FOR MOTION VECTOR SIGN PREDICTION IN VIDEO CODING

CROSS REFERENCE TO RELATED APPLICATIONS

The present invention claims priority to U.S. Provisional Patent Application, Ser. No. 62/425,172, filed on Nov. 22, 2016. The U.S. Provisional Patent Application is hereby incorporated by reference in its entirety.

TECHNICAL FIELD

The present invention relates to motion vector prediction for video coding. In particular, the present invention relates to motion vector sign derivation or prediction to improve coding efficiency of motion vector coding.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed as coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are Intra prediction and Inter prediction. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. Therefore, in AMVP mode, an MVP index for MVP and the corresponding MVDs are required to be encoded and transmitted. In addition, the Inter prediction direction to specify the prediction directions among bi-prediction, and uni-prediction related to list 0 (L0) and list 1 (L1) along with the reference frame index for each list should also be encoded and transmitted.

When a PU is coded in either Skip or Merge mode, no motion information is transmitted except for the Merge index of the selected candidate. That is because the Skip and Merge modes utilize motion inference methods (i.e., MV=MVP+MVD, where MVD is zero) to obtain the motion information from spatial neighbouring blocks (spatial candidates) or a temporal block (temporal candidate) located in a co-located picture where the co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

SUMMARY

A method and apparatus of motion vector reconstruction in a video coding system based on one MVP (motion vector predictor) and one MVD (motion vector difference) are disclosed. According to this method, input data associated with a video sequence including a current block in a current picture are received. An MVP from the input data for the current block is determined. Also, first magnitude and second magnitude of an MVD associated with the current block are determined. Candidate reconstructed MV (motion vector) positions corresponding to all candidate sign pairs of the MVD are derived, where each candidate reconstructed MV position is derived as a vector sum of the MVP and the first magnitude and the second magnitude of the MVD with one candidate sign pair of the MVD. A template for the current block is determined, where the template is formed from neighbouring reconstructed pixels of the current block. Template matching between the template for the current block and a corresponding template for each candidate reconstructed MV position is evaluated. A target candidate MV position among all candidate reconstructed MV positions is selected based on one or more performance criteria including best template matching among all candidate reconstructed MV positions. The current block is encoded or decoded using a target candidate MV corresponding to the target candidate MV position.

The template matching is evaluated based on a predetermined criterion comprising SAD (sum of absolution differences) or SSD (sum of squared differences). The performance criteria further include other decoder side information comprising statistics of previous selected sign pair or previous MVP. In one embodiment, the template matching between the template for the current block and the corresponding template for each candidate reconstructed MV position is evaluated based on nearby integer pixel positions of the corresponding template if the MVP or the MVD has fractional-pel precision. In this case, if two corresponding templates for two candidate reconstructed MV positions fall into a same location, locations of said two corresponding templates are modified to become separate. Furthermore, the locations of the two corresponding templates can be modified to be on a left side and a right side of the MVP, or on an upper side and a lower side of the MVP.

The method may comprise pruning one or more candidate reconstructed MV positions based on distance between one MVP and one candidate reconstructed MV position, where if a specific candidate reconstructed MV position is closer to another MVP in a candidate MVP set than the MVP, the specific candidate reconstructed MV position is pruned and not evaluated for the template matching.

Whether to encode or decode the current block using the target candidate MV can be turned on or off explicitly by signalling a control flag. Alternatively, whether to encode or decode the current block using the target candidate MV can also be turned on or off implicitly. For example, whether to encode or decode the current block using the target candidate MV can be turned on or off based on a result of an exclusive OR operation applied to the first magnitude and the second magnitude of the MVD.

The selected sign pair corresponding to the target candidate MV position can be used as a predictor for encoding or decoding signs of the MVD. A prediction hit condition corresponding to the signs of the MVD being equal to the selected sign pair can be coded using a single bit or the shortest codeword. Other prediction conditions corresponding to the signs of the MVD being not equal to the selected sign pair can be coded using two or more bits, where the other prediction conditions include a horizontal flip condition, a vertical flip condition and a diagonal flip condition. The bins generated for prediction conditions associated with blocks in the current picture can be context coded.

In another embodiment, if any of the first magnitude and the second magnitude of the MVD is zero, a first single sign from the current block can be combined with a second single sign from another block or another prediction list to form a joint sign pair, and a prediction hit condition corresponding to both the first single sign and the second single sign being correctly predicted can be coded using a single bit or the shortest codeword. Other prediction conditions corresponding to at least one of the joint sign pair being not correctly predicted can be coded using two or more bits, where the other prediction conditions include a first single sign hit and a second single sign miss condition, a first single sign miss and a second single sign hit condition and both the first single sign miss and the second single sign miss condition.

Aspects of the disclosure further provide a non-transitory computer readable medium storing program instructions for causing a processing circuit of an apparatus to perform a motion vector reconstruction method based on one MVP (motion vector predictor) and one MVD (motion vector difference). In some embodiment, input data associated with a video sequence including a current block in a current picture are received. An MVP from the input data for the current block is determined. Also, first magnitude and second magnitude of an MVD associated with the current block are determined. Candidate reconstructed MV (motion vector) positions corresponding to all candidate sign pairs of the MVD are derived, where each candidate reconstructed MV position is derived as a vector sum of the MVP and the first magnitude and the second magnitude of the MVD with one candidate sign pair of the MVD. A template for the current block is determined, where the template is formed from neighbouring reconstructed pixels of the current block. Template matching between the template for the current block and a corresponding template for each candidate reconstructed MV position is evaluated. A target candidate MV position among all candidate reconstructed MV positions is selected based on one or more performance criteria including best template matching among all candidate reconstructed MV positions. The current block is encoded or decoded using a target candidate MV corresponding to the target candidate MV position.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

When a current block (or a prediction unit, PU) is coded in Inter AMVP mode, an MVP index and two MVDs for X and Y components are coded to represent the MVs. According to HEVC, for each MVD, magnitude and sign are coded separately using CABAC (Context-Adaptive Binary Arithmetic Coding) entropy coding. Due to different statistics, the magnitude part is always coded using context bin and the sign part is coded using bypass bin (i.e., with equal probability). In this invention, a scheme to code (i.e., encode/decode) the MVD signs more efficiently is disclosed.

Figure 1:
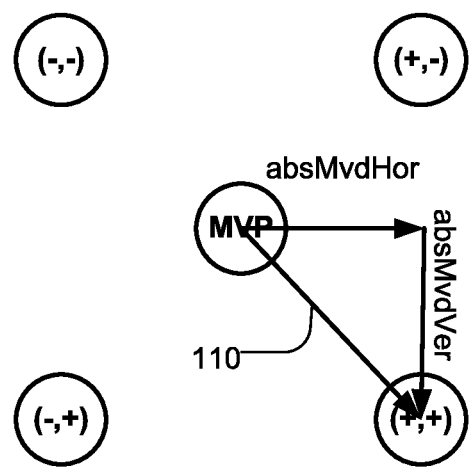
FIG. 1 illustrates an example of motion vector (MV) reconstruction based on the motion vector predictor (MVP) and magnitudes of motion vector differences (MVDs).

When MVP is used, MVs are reconstructed using MVP and MVDs at the decoder side. With the signs of MVDs un-knowing, there are four possibilities for each MV, as shown in FIG. 1. As shown in FIG. 1, absMvdHor and absMvdVer are the absolute values (i.e., magnitudes) of the X and Y components of the MVD 110 respectively. As shown in this example, if the signs of both X and Y components of the MVD are positive, then the MV can be derived using MVP plus MVD (i.e., MV=MVP+MVD) as indicated in FIG. 1. If the decoder can infer the correct sign position, there is no need to code the signs in the bitstream. In order to perform the decoding process correctly, the same sign derivation process will be performed at the encoder side as well. In FIG. 1, the circle labelled as MVP indicates the position pointed to by the MVP. The four circles labelled with different sign pairs (i.e., (+, +), (+, −), (−, +), (−, −)) correspond to four possible sign positions pointed to by the reconstructed MV. In this disclosure, the MVD may also refer to a vector with MVD X component and MVD Y component for convenience.

Figure 2:
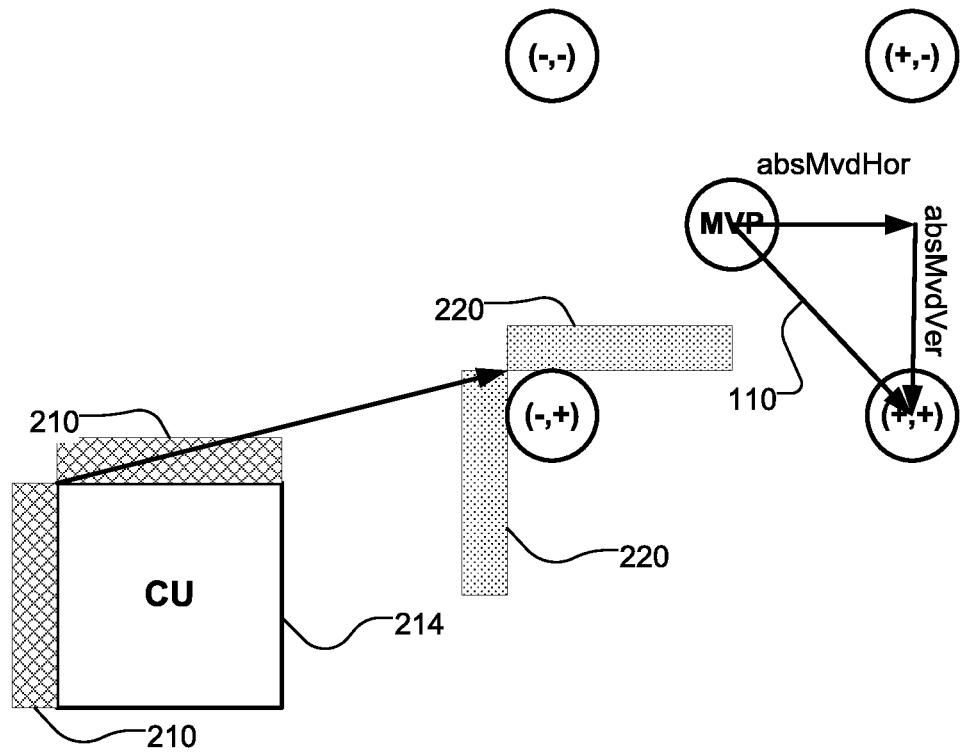
FIG. 2 illustrates an example of sign derivation for motion vector differences (MVDs) using template matching according to the present invention.

In one embodiment, template matching method is used for the decoder to derive the correct sign position. An example of deriving the correct sign position is shown in FIG. 2, where the MV of a current block (214) is to be decoded. The neighbouring reconstructed pixels of current block 214 are used to form a template (210). The MVP can be derived at the decoder side according to MVP index. At the encoder side, the MVP will be selected from a candidate list and the index of the selected MVP is signalled in the bitstream. When the absMvdHor and absMvdVer are decoded at the decoder, the four possible positions of the reconstructed MV can be determined as shown by the four circles labelled with different sign pairs. The corresponding templates at each possible reconstructed MV position (also referred as "candidate reconstructed MV position" in this disclosure) can be formed. In FIG. 2, the corresponding template (220) for possible position corresponding to (−,+) is shown. Similarly, the templates for three other possible positions can be determined. The corresponding templates are formed with the same number of pixels, shape and distance as the template for the current block in order to perform the template matching. For example, template 210 is matched with template 220. After the matching results for all four possible positions are determined, the best match position based on a predetermined criterion (e.g. SAD or SSD) can be inferred to be the final MVD sign position. Any other information available at the decoder side can also be used to help the sign deriving process and to improve the correctness. For example, the previous statistics of the sign position, MVP position etc. can be used.

In another embodiment, the templates for the four possible sign positions can be derived without using the exact MV precision. For example, if the MVs are coded using quarter-pixel precision, the template positions can be derived using the nearest integer position. However, the two integer-based template positions associated with the "−" and "+" signs in the X direction or the Y direction may fall into the same position, which may occur particularly for small absMvdHor or absMvdVer. If any two of these integer-based templates fall into a same position, constraints or rules can be applied to make sure the two templates are apart from each other. For example, if two templates fall into the same position, one should be located at the left hand side of the MVP and the other should be located at the right hand side of the MVP. Alternatively, one should be located at the upper side of the MVP and the other should be located at the lower side of the MVP.

Figure 3:
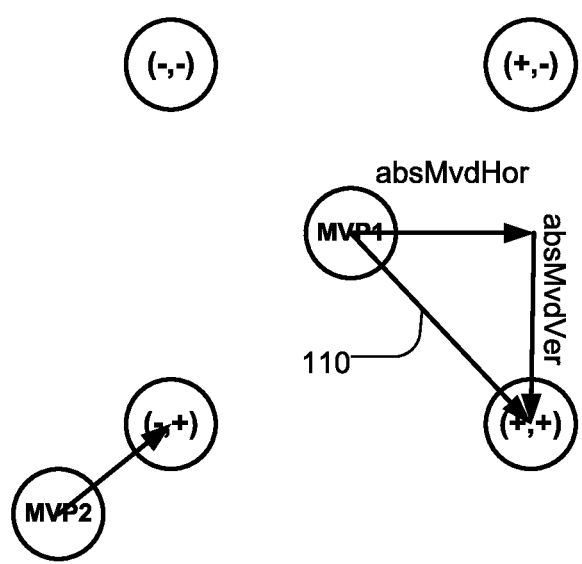
FIG. 3 illustrates an example of pruning one or more candidate sign positions using available information at the decoder side, such as the distance between a candidate sign position and motion vector predictors (MVP) including a current MVP and another MVP from the candidate MVP set.

In another embodiment, the available information at the decoder can be used to improve the correctness of the sign prediction derivation process. FIG. 3 illustrates an example, where there are a total of two MVPs (e.g. MVP1 and MVP2) and MVP1 is used for the current block by the encoder. In other words, MVP2 is in the candidate MVP set, but not selected by the encoder as the MVP for the current block. At the decoder side, one or more of the four possible MVD sign positions can be pruned according to the corresponding distances from a sign position to these two MVPs. As shown in this example, if the (−,+) position is used to reconstruct the MV, the resulted MV position will be closer to MVP2 position instead of MVP1 position. Therefore, the sign (−,+) position can be pruned since the encoder would favour a shorter distance (i.e., smaller MVD magnitude) between a sign position and the MVP position. If the (−,+) position is the correct position, the encoder would have selected MVP2 instead of MVP1. By pruning some of the sign positions, it can reduce the possibility of selecting a wrong sign position and also reduce the required computations for evaluating the template matching.

In another embodiment, the sign derivation process can be signalled using one explicit flag to turn on and off.

In another embodiment, the sign derivation process can be determined using implicit method to turn on and off. For example, to turn on the process when the XOR (i.e., exclusive OR operation) between the X component of the MVD and the Y component of the MVD results in an even number (i.e., "0"), and to turn off otherwise.

In another embodiment, the derived sign position can be used a predictor. The true MVD sign can be coded using residues. Table 1 illustrates an example of a codeword table to code the sign residues using the sign predictors. According to the codeword table, if the predictor inferred by the derived sign process matches the true MVD sign position, only one bin or bin (i.e., "0" in Table 1) needs to be coded. On the other hand, the original method will require two bins or bits (one for each sign) for the MVDs. If the predictor is wrong and is the true MVD sign position matches the diagonal sign position of the derived sign position (referred as Diagonal flipping for this condition), more bins or bits (three in this example) are needed. However, no matter how many bins or bits are used in this sign residue coding, coding sign will no longer use bypass bin with equal probability. Instead, it can use context coding with more efficient adaptive probability update. Table 1 also include horizontal flip prediction condition and vertical flip prediction condition. The horizontal flip prediction condition refers to the condition that the true MVD sign position matches the other sign position in the horizontal direction of the derived sign position. The vertical flip prediction condition refers to the condition that the true MVD sign position matches the other sign position in the vertical direction of the derived sign position. In the example as shown in Table 1, the predictor matching the true MVD sign position (i.e., a prediction hit condition corresponding to the signs of the MVD being equal to the selected sign pair) is coded using shortest codeword.

TABLE 1

|  | Code word |
| --- | --- |
| Prediction hit | 0 |
| Horizontal flip | 10 |
| Vertical flip | 110 |
| Diagonal flip | 111 |

In another embodiment, when any one of the X component and Y component of the MVD is zero, there exist only one MVD sign and two possible sign positions for the non-zero components. In that case, only one code word is needed to indicate if the prediction is hit or not (i.e., miss) in Table 1. The codeword table in Table 1 is still applicable. However, more efficient variation may be applied. Two single sign residues that may come from different prediction lists or different blocks can be combined into one and then use the codeword table in Table 2. In this situation, the code word table will represent different semantics as shown in Table 2.

TABLE 2

|  | Code word |
| --- | --- |
| Both hit | 0 |
| The first hit and the second miss | 10 |
| The first miss and the second hit | 110 |
| Both miss | 111 |

In another embodiment, at the encoder side, the bits resulted from the sign residues can be taken into consideration during the mode decision in order to choose the best modes. Moreover, during the motion estimation for searching the MVs, it can also consider the sign residue bits for every MV position. In other words, the MV not only generates the better predictors for the current block, but also results in less coded bin for the MVD sign residues.

Figure 4:
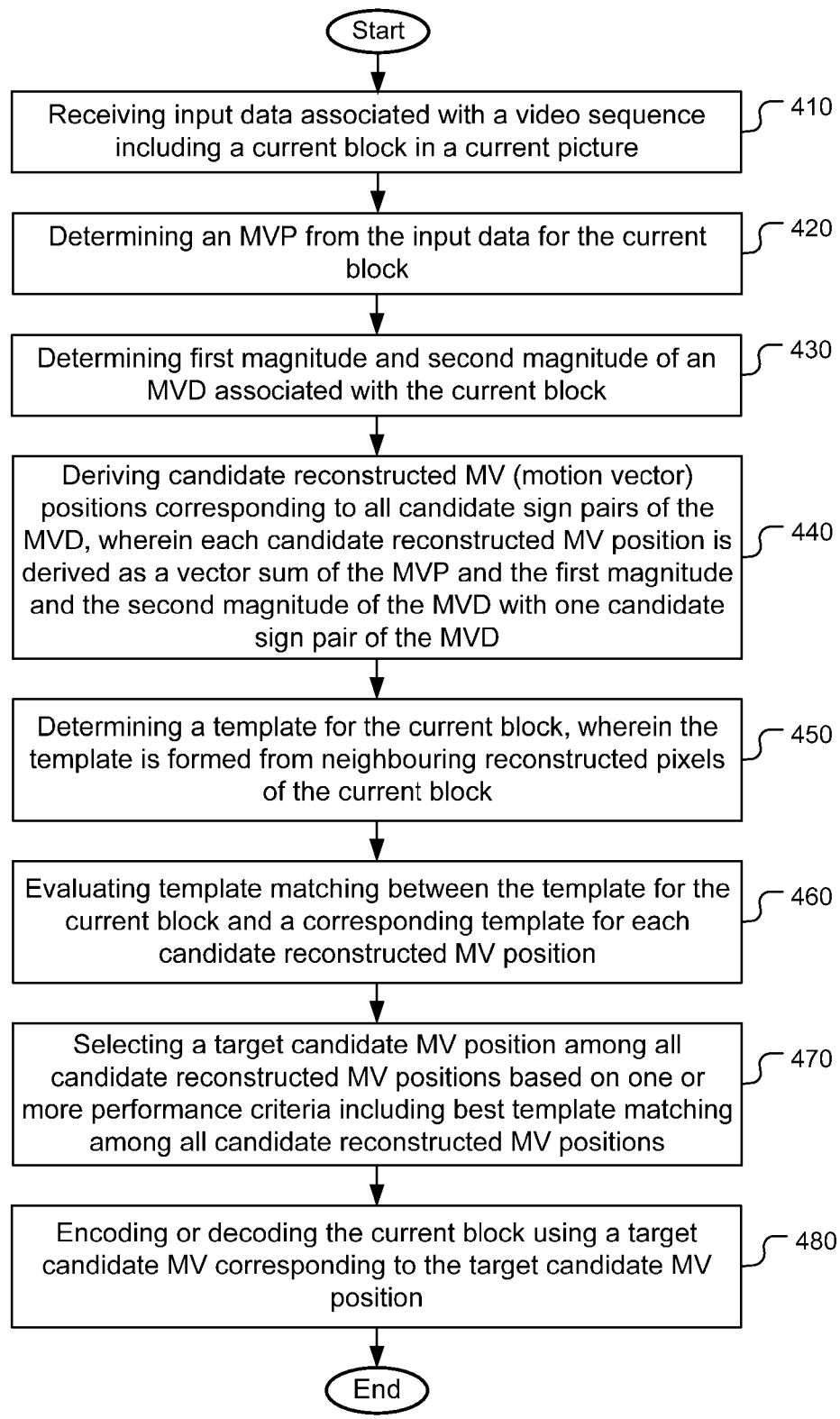
FIG. 4 illustrates an exemplary flowchart of video coding system incorporate an embodiment of the present invention, where the signs of motion vector differences (MVDs) are derived or predicted using template matching.

FIG. 4 illustrates an exemplary flowchart of video coding system incorporate an embodiment of the present invention, where the signs of motion vector differences (MVDs) are derived or predicted using template matching. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a video sequence including a current block in a current picture are received in step 410. At the encoder side, the input data may correspond to pixel data associated with a video sequence. At the decoder side, the input data may correspond to video bitstream or compressed data for the video sequence. An MVP from the input data for the current block is determined in step 420. As is known in video coding, the encoder may selects the MVP from a candidate MVP set and signal the MVP index associated with the selected MVP. The decoder can selected the MVP from the candidate MVP set according to the MVP index. The first magnitude and second magnitude of an MVD associated with the current block are determined in step 430. The encoder can obtain the MVD from the difference between the current MV and the MVP. The magnitudes of the MVD are signalled in the bitstream. The decoder may recover the magnitudes of the MVD from the bitstream. Candidate reconstructed MV (motion vector) positions corresponding to all candidate sign pairs of the MVD are derived in step 440, where each candidate reconstructed MV position is derived as a vector sum of the MVP and the first magnitude and the second magnitude of the MVD with one candidate sign pair of the MVD. This same step is performed at the encoder as well as the decoder. A template for the current block is determined in step 450, where the template is formed from neighbouring reconstructed pixels of the current block. Template matching between the template for the current block and a corresponding template for each candidate reconstructed MV position is then performed in step 460. A target candidate MV position is selected among all candidate reconstructed MV positions based on one or more performance criteria including best template matching among all candidate reconstructed MV positions in step 470. Encoding or decoding is then applied to the current block using a target candidate MV corresponding to the target candidate MV position in step 480.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of motion vector reconstruction in a video coding system based on one MVP (motion vector predictor) and one MVD (motion vector difference), the method comprising:

receiving input data associated with a video sequence including a current block in a current picture;

determining an MVP from the input data for the current block;

determining first magnitude and second magnitude of an MVD associated with the current block;

deriving candidate reconstructed MV (motion vector) positions corresponding to all candidate sign pairs of the MVD, wherein each candidate reconstructed MV position is derived as a vector sum of the MVP and the first magnitude and the second magnitude of the MVD with one candidate sign pair of the MVD;

determining a template for the current block, wherein the template is formed from neighbouring reconstructed pixels of the current block;

evaluating template matching between the template for the current block and a corresponding template for each candidate reconstructed MV position;

selecting a target candidate MV position among all candidate reconstructed MV positions based on one or more performance criteria including best template matching among all candidate reconstructed MV positions; and encoding or decoding the current block using a target candidate MV corresponding to the target candidate MV position.

2. The method of claim 1, wherein the template matching is evaluated based on a pre-determined criterion comprising SAD (sum of absolution differences) or SSD (sum of squared differences).

3. The method of claim 1, wherein said one or more performance criteria further include other decoder side information comprising statistics of previous selected sign pair or previous MVP.

4. The method of claim 1, wherein the template matching between the template for the current block and the corresponding template for each candidate reconstructed MV position is evaluated based on nearby integer pixel positions of the corresponding template if the MVP or the MVD has fractional-pel precision.

5. The method of claim 4, wherein if two corresponding templates for two candidate reconstructed MV positions fall into a same location, locations of said two corresponding templates are modified to become separate.

6. The method of claim 5, wherein said locations of said two corresponding templates are modified to be on a left side and a right side of the MVP, or on an upper side and a lower side of the MVP.

7. The method of claim 1, further comprising pruning one or more candidate reconstructed MV positions based on distance between one MVP and one candidate reconstructed MV position, wherein if a specific candidate reconstructed MV position is closer to another MVP in a candidate MVP set than the MVP, the specific candidate reconstructed MV position is pruned and not evaluated for the template matching.

8. The method of claim 1, wherein whether to encode or decode the current block using the target candidate MV is turned on or off explicitly by signalling a control flag.

9. The method of claim 1, wherein whether to encode or decode the current block using the target candidate MV is turned on or off implicitly.

10. The method of claim 9, wherein whether to encode or decode the current block using the target candidate MV is turned on or off based on a result of an exclusive OR operation applied to the first magnitude and the second magnitude of the MVD.

11. The method of claim 1, wherein selected sign pair corresponding to the target candidate MV position is used as a predictor for encoding or decoding signs of the MVD.

12. The method of claim 11, wherein a prediction hit condition corresponding to the signs of the MVD being equal to the selected sign pair is coded using shortest codeword.

13. The method of claim 11, wherein a prediction hit condition corresponding to the signs of the MVD being equal to the selected sign pair is coded using a single bit.

14. The method of claim 13, wherein other prediction conditions corresponding to the signs of the MVD being not equal to the selected sign pair are coded using two or more bits, wherein said other prediction conditions include a horizontal flip condition, a vertical flip condition and a diagonal flip condition.

15. The method of claim 14, wherein bins generated for prediction conditions associated with blocks in the current picture are context coded.

16. The method of claim 1, wherein if any of the first magnitude and the second magnitude of the MVD is zero, a first single sign from the current block is combined with a second single sign from another block or from the current block in another prediction list to form a joint sign pair.

17. The method of claim 16, wherein a prediction hit condition corresponding to both the first single sign and the second single sign being correctly predicted is coded using a single bit or a shortest codeword.

18. The method of claim 16, wherein other prediction conditions corresponding to at least one of the joint sign pair being not correctly predicted are coded using two or more bits, wherein said other prediction conditions include a first single sign hit and a second single sign miss condition, a first single sign miss and a second single sign hit condition and both the first single sign miss and the second single sign miss condition.

19. An apparatus for motion vector reconstruction in a video coding system based on one MVP (motion vector predictor) and one MVD (motion vector difference), the apparatus comprising one or more electronic devices or processors configured to:

receive input data associated with a video sequence including a current block in a current picture;

determine an MVP from the input data for the current block;

determine first magnitude and second magnitude of an MVD associated with the current block;

derive candidate reconstructed MV (motion vector) positions corresponding to all candidate sign pairs of the MVD, wherein each candidate reconstructed MV position is derived as a vector sum of the MVP and the first magnitude and the second magnitude of the MVD with one candidate sign pair of the MVD;

determine a template for the current block, wherein the template is formed from neighbouring reconstructed pixels of the current block;

evaluate template matching between the template for the current block and a corresponding template for each candidate reconstructed MV position;

select a target candidate MV position among all candidate reconstructed MV positions based on one or more performance criteria including best template matching among all candidate reconstructed MV positions; and encode or decode the current block using a target candidate MV corresponding to the target candidate MV position.

20. A non-transitory computer readable medium storing program instructions causing a processing circuit of an apparatus to perform a motion vector reconstruction method based on one MVP (motion vector predictor) and one MVD (motion vector difference), and the method comprising:

receiving input data associated with a video sequence including a current block in a current picture;

determining an MVP from the input data for the current block;

determining first magnitude and second magnitude of an MVD associated with the current block;

deriving candidate reconstructed MV (motion vector) positions corresponding to all candidate sign pairs of the MVD, wherein each candidate reconstructed MV position is derived as a vector sum of the MVP and the first magnitude and the second magnitude of the MVD with one candidate sign pair of the MVD;

determining a template for the current block, wherein the template is formed from neighbouring reconstructed pixels of the current block;

evaluating template matching between the template for the current block and a corresponding template for each candidate reconstructed MV position;

selecting a target candidate MV position among all candidate reconstructed MV positions based on one or more performance criteria including best template matching among all candidate reconstructed MV positions; and encoding or decoding the current block using a target candidate MV corresponding to the target candidate MV position.

* * * * *